United States Patent
Shelor (10) Patent No.: US 7,194,601 B2
(45) Date of Patent: Mar. 20, 2007

(54) LOW-POWER DECODE CIRCUITRY AND METHOD FOR A PROCESSOR HAVING MULTIPLE DECODERS

(75) Inventor: Charles F. Shelor, Arlington, TX (US)

(73) Assignee: VIA-Cyrix, Inc, Fremont, CA (US)

( * ) Notice: Subject to any disclaimer, the term of this patent is extended or adjusted under 35 U.S.C. 154(b) by 517 days.

(21) Appl. No.: 10/406,742

(22) Filed: Apr. 3, 2003

(65) Prior Publication Data
US 2004/0199747 A1    Oct. 7, 2004

(51) Int. Cl.
  *G06F 9/30* (2006.01)
(52) U.S. Cl. .......................... 712/209; 712/32; 712/43
(58) Field of Classification Search ............... 712/212, 712/32, 43, 209
  See application file for complete search history.

(56) References Cited

U.S. PATENT DOCUMENTS

| | | | | |
|---|---|---|---|---|
| 4,955,038 A | * | 9/1990 | Lee et al. | 375/256 |
| 5,159,689 A | * | 10/1992 | Shiraishi | 712/208 |
| 5,182,810 A | * | 1/1993 | Bartling et al. | 713/323 |
| 5,598,546 A | | 1/1997 | Blomgren | 395/385 |
| 5,721,933 A | * | 2/1998 | Walsh et al. | 713/300 |
| 5,781,750 A | * | 7/1998 | Blomgren et al. | 712/209 |
| 5,805,907 A | * | 9/1998 | Loper et al. | 713/320 |
| 5,864,702 A | * | 1/1999 | Walsh et al. | 713/320 |
| 5,901,301 A | * | 5/1999 | Matsuo et al. | 712/212 |
| 6,081,890 A | | 6/2000 | Datta | |
| 6,272,620 B1 | * | 8/2001 | Kawasaki et al. | 712/41 |
| 6,393,572 B1 | | 5/2002 | Datta et al. | |
| 6,516,408 B1 | * | 2/2003 | Abiko et al. | 712/227 |
| 6,795,930 B1 | * | 9/2004 | Laurenti et al. | 713/324 |
| 7,088,139 B1 | * | 8/2006 | Blom | 326/60 |

FOREIGN PATENT DOCUMENTS

| | | |
|---|---|---|
| CN | 1332407 | 1/2002 |
| GB | 2289353 | 11/1995 |

* cited by examiner

*Primary Examiner*—Donald Sparks
*Assistant Examiner*—Vincent Lai
(74) *Attorney, Agent, or Firm*—Thomas, Kayden, Horstemeyer & Risley (57) ABSTRACT

A processor includes first decoder logic capable of decoding a plurality of encoded instructions comprising a first instruction set, the first decoder logic having an input to receive an encoded instruction output from the fetch logic. The processor also includes second decoder logic capable of decoding a plurality of encoded instructions comprising a second instruction set, the second decoding logic having an input to receive an encoded instruction output from the fetch logic. Finally, the processor includes decoder control logic configured to selectively control active operation of the first decoder logic and the second decoder logic. In operation, the decoder control logic operates such that when the first decoder logic is decoding an instruction then the second decoder logic is operated in a lower-power, inactive mode. Likewise, when the second decoder logic is decoding an instruction then the first decoder logic is operated in a lower-power, inactive mode.

16 Claims, 7 Drawing Sheets

LOW-POWER DECODE CIRCUITRY AND METHOD FOR A PROCESSOR HAVING MULTIPLE DECODERS

FIELD OF THE INVENTION

The present invention is generally related to processors, and, more particularly to decoder circuitry for a processor having a low-power operation.

BACKGROUND

Processors (e.g., microprocessors) are well known and used in a wide variety of products and applications, from desktop computers to portable electronic devices, such as cellular phones and PDAs (personal digital assistants). As is known, some processors are extremely powerful (e.g., processors in high-end computer workstations), while other processors have a simpler design, for lower-end, less expensive applications and products.

As is also known, there is a general dichotomy between performance and power. Generally speaking, high-performance processors having faster operation and/or more complex designs tend to consume more power than lower-performance counterparts. Higher power consumption generally leads to higher operating temperatures and shorter battery life (for devices that operate from battery power). The ever-increasing demand and use of portable electronic devices is driving a demand to produce processors that realize lower-power operation, while at the same time maintaining satisfactory performance levels.

One known way of reducing the power consumption of devices is to provide modes of low-power operation (sometimes referred to as "sleep states") when the devices (or certain portions thereof) are not in use. However, there is also a desire to reduce the power consumption of devices, during active operation. This is often accomplished by providing more efficient designs to the operational components of the devices.

Figure 1:
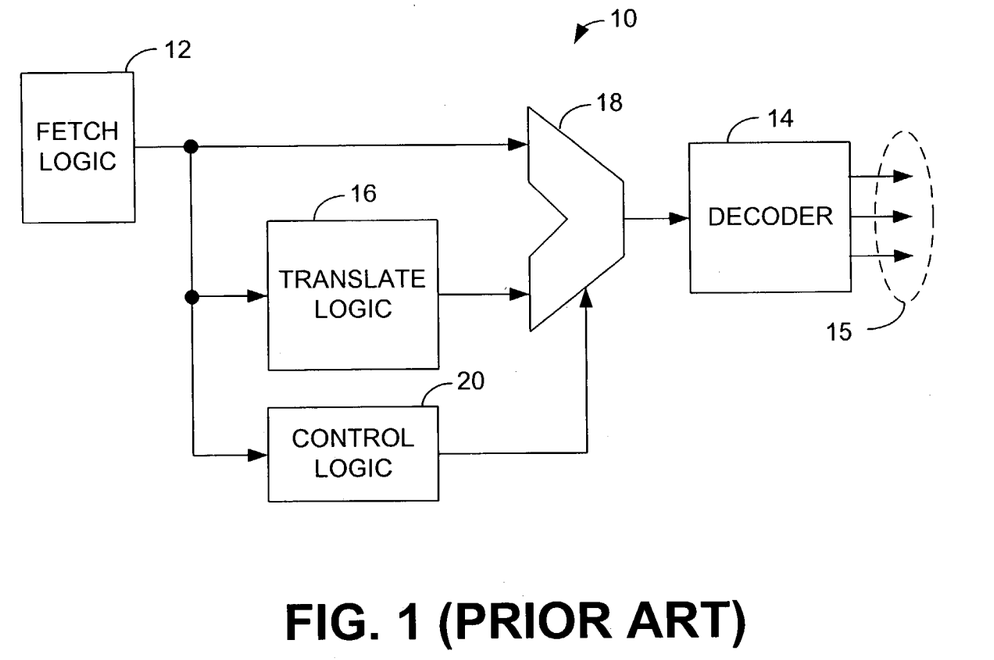
FIG. 1 is a block diagram illustrating decode logic for a processor, as known in the prior art.

There are a number of power-consuming components in various electronic devices, and the processor is one of them. Even within a processor, there are a variety of functional sections, and decode logic is one such area. As is known, the decoder logic of a processor decodes an encoded instruction into a number electrical signals for controlling and carrying out the function of the instruction within execution logic provided on in the processor. FIG. 1 is a block diagram illustrating conventional decode logic within a processor.

At a very high level, the fetch/execute portion 10 of a processor includes fetch logic 12 for fetching an encoded instruction and decoder logic 14 for decoding the instruction. As mentioned above, the decoder 14 operates to decode an encoded instruction into a plurality of signal lines 15, which are used to control and carry out the execution of the encoded instruction. In this regard, the outputs 15 from the decoder 14 are signal lines that are used as inputs and/or control signals for other circuit components within an execution unit (not shown) of the processor, and the execution unit carries out the functional operations specified by the encoded instructions. This basic operation is well known, and need not be described further herein.

In processors that accommodate more than one instruction set, or that accommodate instructions that are not contained within the instruction set that is accommodated by the decoder 14, logic 16 may be provided for performing a translation of an encoded instruction that would otherwise be unrecognized by the decoder 14. One way that such instructions have been handled in prior art systems is to provide logic 16 that translates the otherwise unrecognized instruction into a sequence of instructions that are recognized by the decoder 14. Of course, when processing a sequence of instructions, additional clock cycles are required for the decoding and execution of those instructions. FIG. 1 illustrates one way of structuring the circuitry for implementing such an approach.

As illustrated in FIG. 1, a multiplexer 18 may be used to selectively input to a decoder 14 either an instruction retrieved directly from the fetch logic 12, or one or more translated instructions received from the translation logic 16. Control logic 20 may be provided for selecting the multiplexer 18 input that is to be directed to the decoder 14. Generally, the control logic 20 would evaluate the encoded instruction received from the fetch logic 12 to ascertain whether it is an instruction that is recognizable by the decoder 14. If so, the multiplexer 18 would be controlled so as to direct the output from the fetch logic 12 to the decoder 14. If, however, the control logic 20 determines that the encoded instruction retrieved from the fetch logic 12 is not an instruction that is recognizable by the decoder 14, then the control logic 20 would control the multiplexer 18 to direct the output of the translation logic 16 to the decoder 14. Of course, additional implementation details would be needed, but are not described herein, as persons of ordinary skill in the art understand the relevant implementation details of the circuitry illustrated in FIG. 1.

Circuitry such as that illustrated in FIG. 1, however, has certain drawbacks. Specifically, the complexity and power requirements of the circuitry are excessive. It will be appreciated that a tradeoff exists between the complexity of the decoder 14 and the complexity of the translation logic 16. In this regard, as more instructions are accommodated by the circuitry of the decoder 14, then the decoder 14 becomes larger and more complex, and therefore more power-consuming. This is particularly disadvantageous when a number of the instructions are used only seldomly. Conversely, as the design of the decoder 14 becomes more simplified to accommodate fewer, more basic instructions, then additional logic will be provided in the translation logic 16 to accommodate additional instructions. Furthermore, while the translation logic 16 is active (actively translating otherwise unrecognized instructions), the decoder 14 is also powered and active to decode the instructions output from the translation logic 16. The simultaneous operation of both decoder 14 and translation logic 16 results in increased power usage.

Accordingly, what is desired is an improved decoder logic design for a processor realizing more efficient and lower-power operation.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a processor having improved decode logic. In accordance with one embodiment, the processor includes first decoder logic capable of decoding a plurality of encoded instructions comprising a first instruction set, the first decoder logic having an input to receive an encoded instruction output from the fetch logic. The processor also includes second decoder logic capable of decoding a plurality of encoded instructions comprising a second instruction set, the second decoding logic having an input to receive an encoded instruction output from the fetch logic. Finally, the processor includes decoder control logic configured to selectively control active operation of the first decoder logic and the second decoder logic. In operation, the decoder control logic operates such that when the first decoder logic is decoding an instruction then the second decoder logic is operated in a lower-power, inactive mode. Likewise, when the second decoder logic is decoding an instruction then the first decoder logic is operated in a lower-power, inactive mode.

In another embodiment, a method is provided for decoding an instruction. The method operates to determine whether the instruction is an instruction of a first instruction set or a second instruction set. If the instruction is determined to be an instruction of a first instruction set, then the method decodes the instruction using a first decoder, and causes a second decoder to remain in an inactive, low-power mode while the first decoder is decoding the instruction. If, however, the instruction is determined to be an instruction of a second instruction set, then the method decodes the instruction using a second decoder, and causing the first decoder to remain in an inactive, low-power mode while the second decoder is decoding the instruction.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 2:
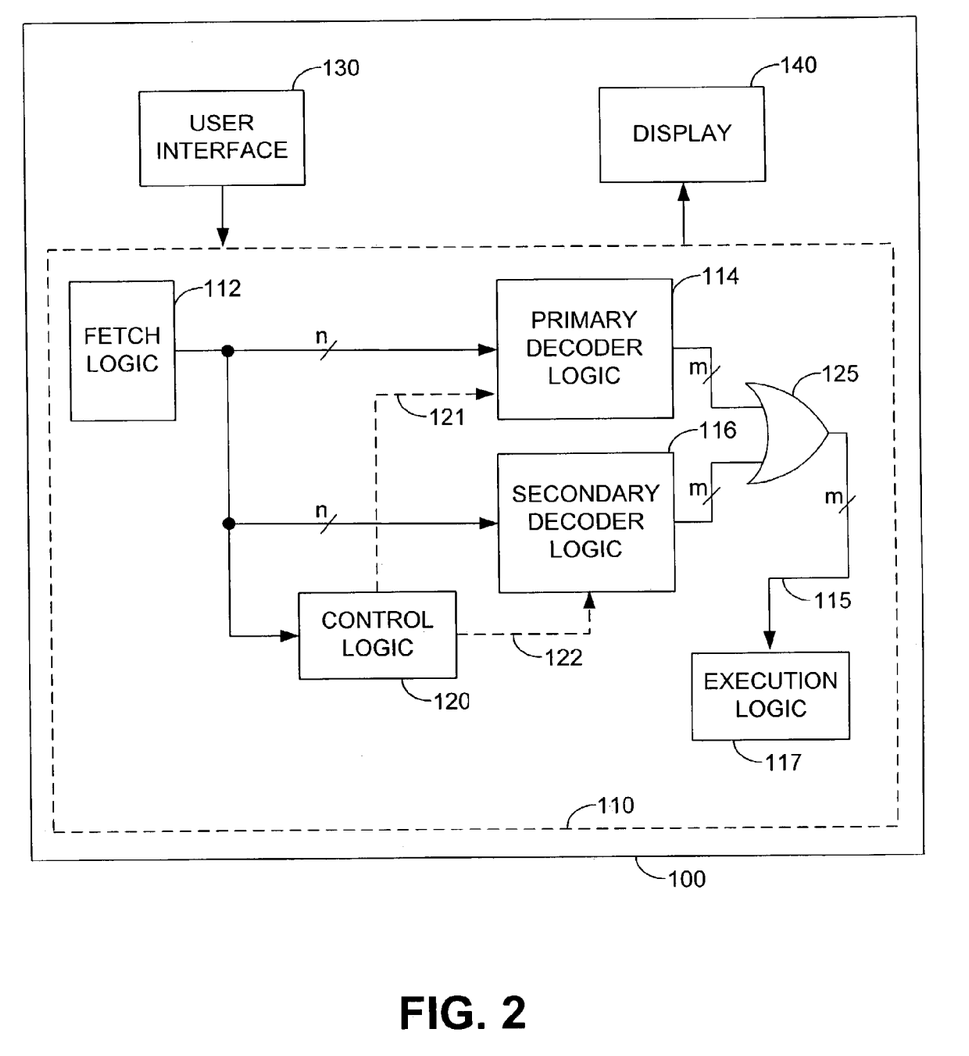
FIG. 2 is a block diagram illustrating a portable electronic device having a processor with decode logic, constructed in accordance with one embodiment of the invention.

Reference is now made to FIG. 2, which illustrates a portable electronic device 100 containing a processor 110 constructed in accordance with an embodiment of the present invention. As is known, there are an ever-increasing number of consumer and other portable electronic devices being developed and used. Most of these devices operate from battery power, and often include a user interface 130 (such as a keypad) and a display 140 (such as a flat-panel display). In many devices, the display 140 may include a touch-sensitive screen, which allows a user to input information through the display 140 as well. User interface 130, display 140, and other known aspects and features of the portable electronic device 100 need not be described herein, as they do not form a relevant part of the present invention.

Instead, the present invention 110 is directed to circuitry and logic contained within the processor 110. Specifically, the present invention is directed to novel decoder logic for a processor that accommodates multiple instruction sets. Like the prior art processor of FIG. 1, a processor 110 constructed in accordance with the invention may include conventional fetch logic 112 for fetching encoded instructions, and execution logic 117 for carrying out the functions and operations specified by the encoded instructions. Since these operations are known, they need not be described further herein.

In the inventive embodiment illustrated in FIG. 2, the processor 110 provides decoder logic for accommodating two distinct instruction sets. As an example, the processor 10 may be designed to accommodate both a 32-bit instruction set as well as a 16-bit instruction set. Multiple instruction sets, such as these may be provided for flexibility in programming, accommodation of legacy software, or other reasons. Generally speaking, 32-bit instruction sets may provide more powerful or robust code and programming capabilities, while 16-bit instruction sets provide for more compact code, which requires less memory. As will be appreciated by persons skilled in the art, other advantages or tradeoffs between 32-bit instruction sets and 16-bit instruction sets may be applicable as well.

Primary decoder logic 114 and secondary decoder logic 116 are provided for decoding instructions of a first (or primary) instruction set and a second (or secondary) instruction set, respectively. The output of the fetch logic 112 is directed to both the primary decoder logic and secondary decoder logic. Significant to this illustrated embodiment, control logic 120 is provided to selectively control the operation of the primary decoder logic 114 and secondary decoder logic 116 by control signals 121 and 122, such that when one of these logic blocks is operating to decode an instruction, the other of the logic blocks is inactive, and therefore consuming only a negligible amount of power. Further, and in contrast to the prior art diagram of FIG. 1, using multiple decoders in this way avoids the translation of instructions from one instruction set to the other before performing the decoding operation. Consequently, for instructions that, for example, fall into the secondary decoder logic instruction set, the elimination of the translation requirement into instructions of a format that may be decoded by the primary decoder 114, the operational speed of the processor is enhanced by avoiding wasted clock cycles in the translation and execution process.

As also illustrated in FIG. 2, the signal path between the fetch logic 112 and the decoders 114 and 116 is "n" bits wide (where "n" is an arbitrary integer, but usually a power of 2). This same signal path is input to the control logic 120, which evaluates the value on the data path output from the fetch logic to determine whether the primary decoder logic 114 or secondary decoder logic 116 should be activated to decode the encoded instruction.

In contrast, "m" signal lines are output from each decoder 114 and 116. Generally speaking, "m" is an integer, which generally will not be the same number as "n." Instead, "m" is an integer that represents the number of signal and control lines that are required by the execution unit 117 for executing the encoded instructions. Of course, the number of signal lines "m" will be implementation specific, based upon the specific circuitry of the execution logic 117. In the illustrated embodiment, there is a 1-to-1 correspondence between the signals output from the primary decoder 114 and the signals output from the secondary decoder 116, and they may be combined by, for example, a logical OR operation 125. In this regard, in the illustrated embodiment, the outputs of the inactive decoder 114 or 116 will be a logic zero. Therefore, the OR operation 125 simply passes the logical values of the signal lines of the active decoder logic 114 or 116 to the execution unit 117 on signal bus 115.

It will be appreciated by persons skilled in the art that there are a variety of ways to specifically implement the concepts illustrated in the diagram of FIG. 2, and the broader aspects of the present invention are not limited by any particular implementation. One example implementation will be described briefly in reference to FIG. 4, while an alternative implementation will be described briefly in reference to FIG. 5 (below). However, it should be appreciated that other implementations may be provided as well.

Figure 3:
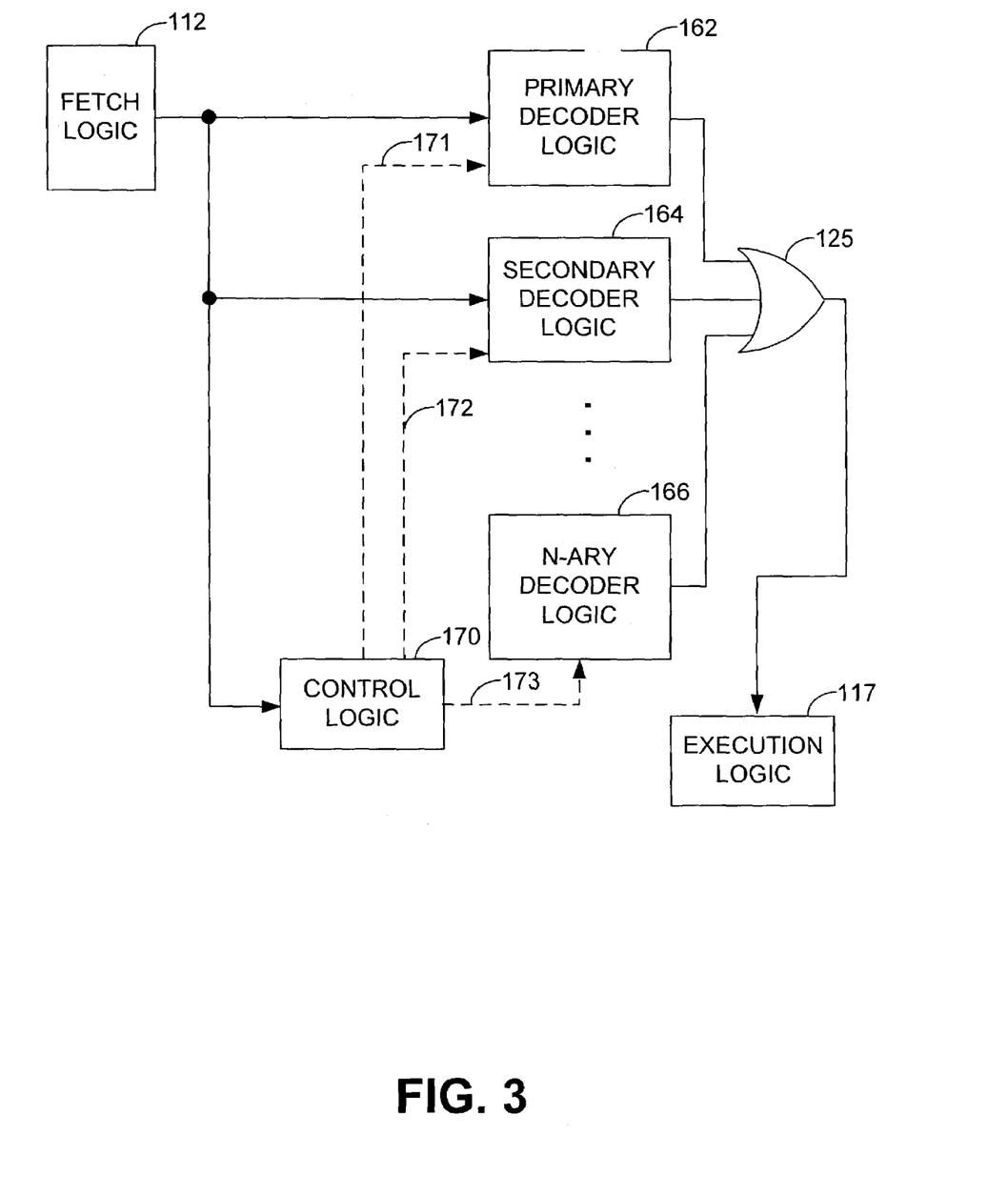
FIG. 3 is a block diagram similar to FIG. 2, but illustrating an alternative embodiment of the invention.

Reference is now made to FIG. 3, which is a block diagram illustrating an alternative embodiment of the decoder logic of the present invention. The fetch logic 112, execution logic 117, and logical OR operation 125 have been assigned the same reference numerals as the corresponding circuit elements and logic blocks of FIG. 2, to represent similar functionality and implementation. Therefore, these blocks need not be redescribed in connection with FIG. 3. The principle difference between the embodiment of FIG. 2 and the embodiment of FIG. 3 is the inclusion of additional decoder logic elements for accommodating additional instruction sets. In this regard, decoder elements 162, 164, and 166 are illustrated, and these decoder elements are labeled as "primary decoder logic," "secondary decoder logic," and "n-ary decoder logic." The function and operation of each of these decoder logic elements is similar to that described in connection with FIG. 2. In the embodiment of FIG. 3, additional instruction sets are accommodated. In one embodiment, the decoder logic of the processor accommodates three distinct instruction sets. Like the embodiment of FIG. 2, one instruction set is a 32-bit instruction set, one instruction set is a 16-bit instruction set, and third instruction set is for JAVA instructions. Such an embodiment or instruction set is useful in devices that provide a Web interface, as JAVA is the programming language utilized by many Web-based applications.

Further, control logic 170 is provided and operates to generate control signals 171, 172, and 173 for controlling the selective operation of the decoder elements 162, 164, and 166, respectively. Again, and as described in connection with FIG. 2, the control logic 170 operates to evaluate an encoded instruction received from the fetch logic 112 and make the determination as to whether to activate the primary decoder logic 162, secondary decoder logic 164, or the n-ary decoder logic 166 for decoding the instruction. The control logic 170 will control the state of the control signals 171, 172, and 173 to ensure that all remaining decoder elements (not actively decoding an instruction) are maintained in an inactive, low-power state.

Figure 4:
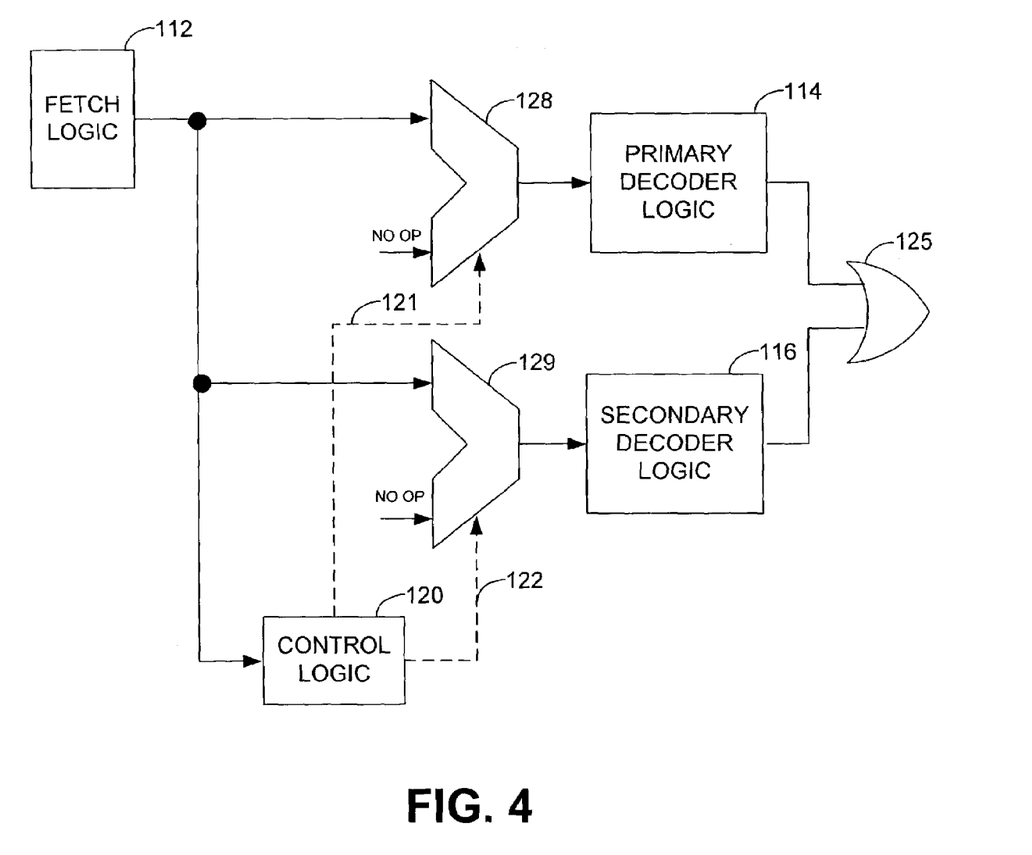
FIG. 4 is a schematic diagram illustrating certain implementation features of one embodiment of the decode logic of the invention.

Reference is now made to FIG. 4, which illustrates an embodiment for implementing the controlled and selective operation of decoder logic elements 114 and 116 (of FIG. 2). Of course, a similar implementation may be provided for implementing the selective and controlled operation of the decoder elements 162, 164, and 166 of FIG. 3 as well. In the illustrated embodiment of FIG. 4, multiplexers 128 and 129 are provided, and the control logic 120 outputs the control signals 121 and 122 for controlling the select logic that is provided within the multiplexers 128 and 129. Each multiplexer 128 and 129 is configured to direct the encoded instruction received from fetch logic 112 to its corresponding decoder logic 114 and 116. Each multiplexer 128 and 129 is further illustrated as having a "no op" input. In one embodiment, the no op input is a value that is otherwise unrecognized by the particular decoder logic. Such a predetermined value causes the decoder logic to enter an inactive (low-power) state of operation. In one implementation, this may be realized through the implementation of decoder logic using CMOS technology, whereby an inactive state of operation results in only a quiescent power draw of its internal gates. As is known, such a low-level power draw is virtually negligible with respect to power demands from the battery or other power source that powers the device.

In operation, the control logic 120 operates to ensure that the output of the fetch logic 112 will not be passed through both multiplexers 128 and 129 at the same time. That is, the select lines 121 and 122 are controlled such that at least one no op instruction is passed through a multiplexer to the corresponding decoder logic at any given time. Further, there may be other times (e.g., idle states), in which the control logic 120 controls both multiplexers 128 and 129 to pass the no op instructions through to the respective decoder logic 114 and 116, respectively, so that both decoders are simultaneously operated in the inactive low-power state, thereby realizing greater power savings.

Figure 5:
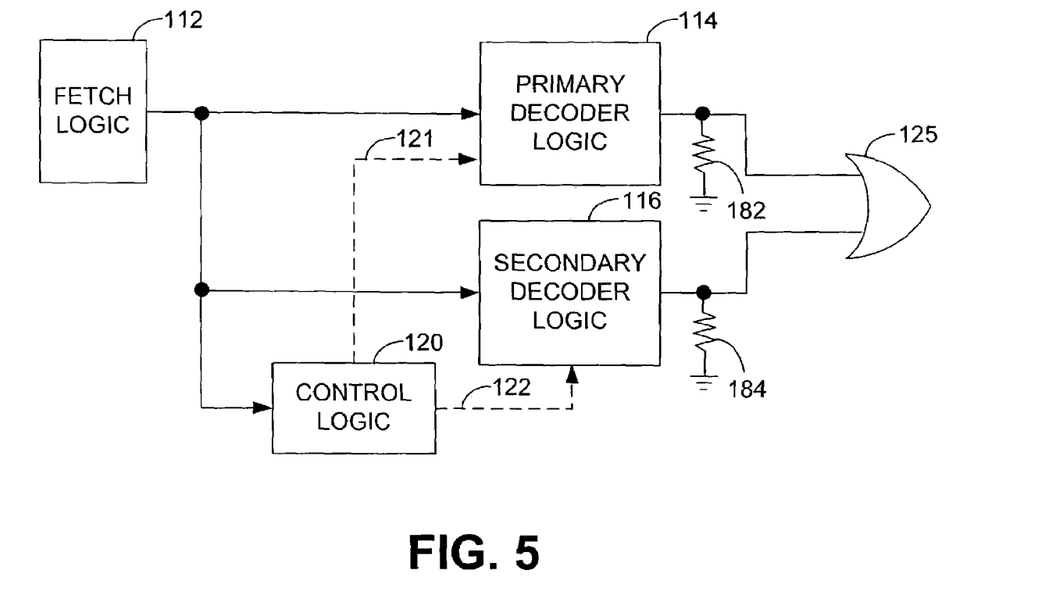
FIG. 5 is a schematic diagram illustrating an alternative implementation of an embodiment of the decode logic of the invention.

Reference is now made to FIG. 5, which is a block diagram showing an alternative implementation of a portion of the decoder logic of an embodiment of the present invention. As mentioned in connection with FIG. 4, one implementation for achieving the low-power operation of the decoder logic may be realized through the utilization of CMOS logic and its low-power, quiescent operation at certain times. Another embodiment, utilizing a differing (non CMOS) logic may be implemented, wherein enable signals 121 and 122 may be provided to the decoder logic 114 and 1116, respectively, to selectively disable the decoder operation and place them in low-power modes of operation. If such an implementation causes the outputs of the decoder logic elements 114 and 116 to float (or go to a tri state), and therefore be in an unstable or uncertain state, then pull down resistors 182 and 184 may be placed on the signal path of each signal output from the respective decoders 114 and 116. These resistors 182 and 184 would, of course, be high impedance resistors to limit the current draw therethrough, and therefore the current draw on the power source.

Figure 6:
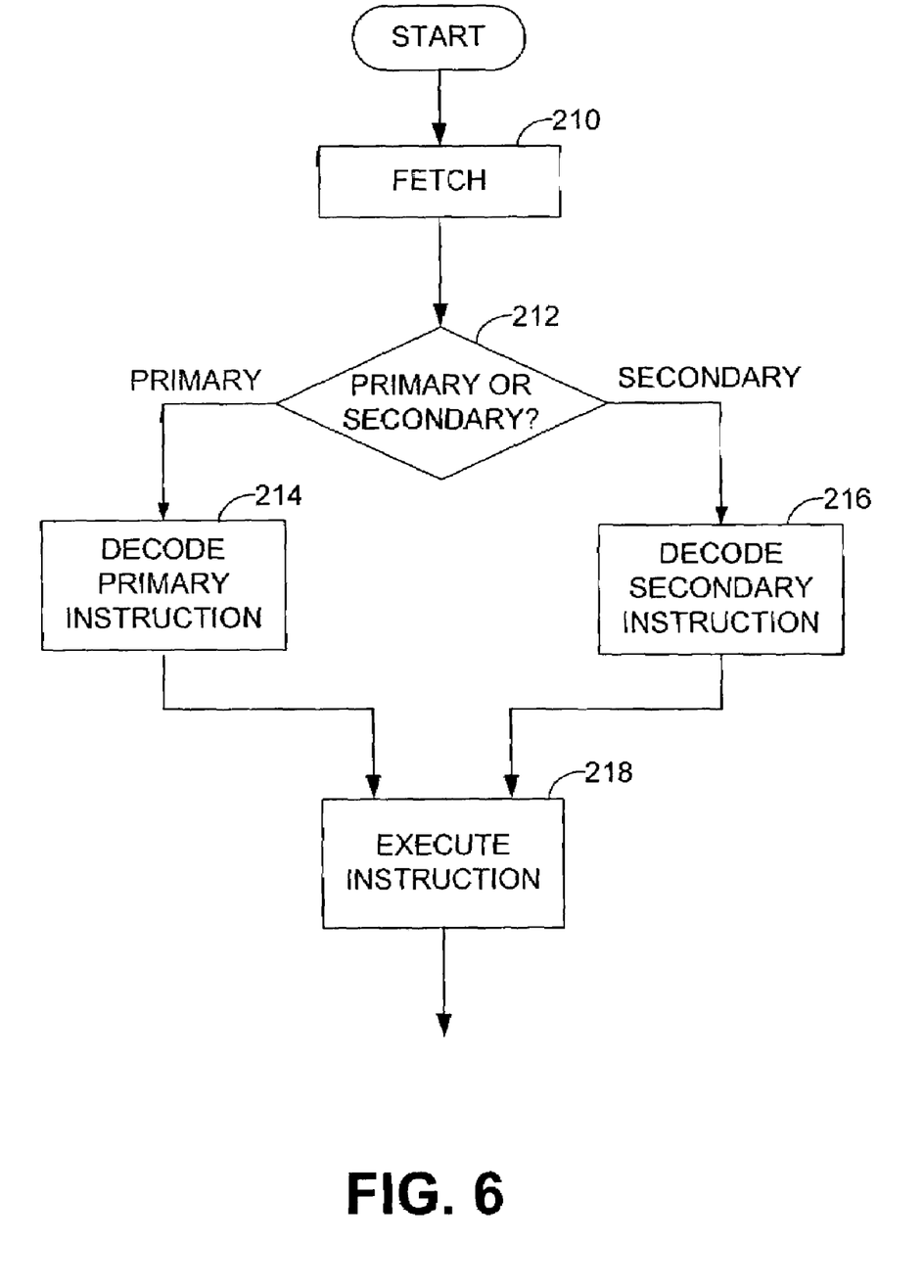
FIG. 6 is a flowchart illustrating certain steps of a method for performing a decode operation in accordance with an embodiment of the invention.

Having described certain features and architectural implementations of certain embodiments of the present invention, reference is now made to FIG. 6, which is a flowchart illustrating the top-level operation of an embodiment of a method implemented in accordance with an embodiment of the invention. In accordance with the illustrated embodiment, a fetch 210 is performed to retrieve an encoded instruction from a memory location. Thereafter, the method evaluates the encoded instruction (step 212) to determine whether the instruction is an instruction supported by first or primary instruction set or whether the instruction is within a second or secondary instruction set. If step 212 determines that the encoded instruction is an instruction of a primary instruction set, then the method directs the encoded instruction to a decoder for decoding primary instruction (step 214). If step 212 determines that the instruction belongs to a secondary instruction set, then the encoded instruction is directed to circuitry for decoding the secondary instruction (step 216). Thereafter, the decoded instruction is executed at step 218.

Figure 7:
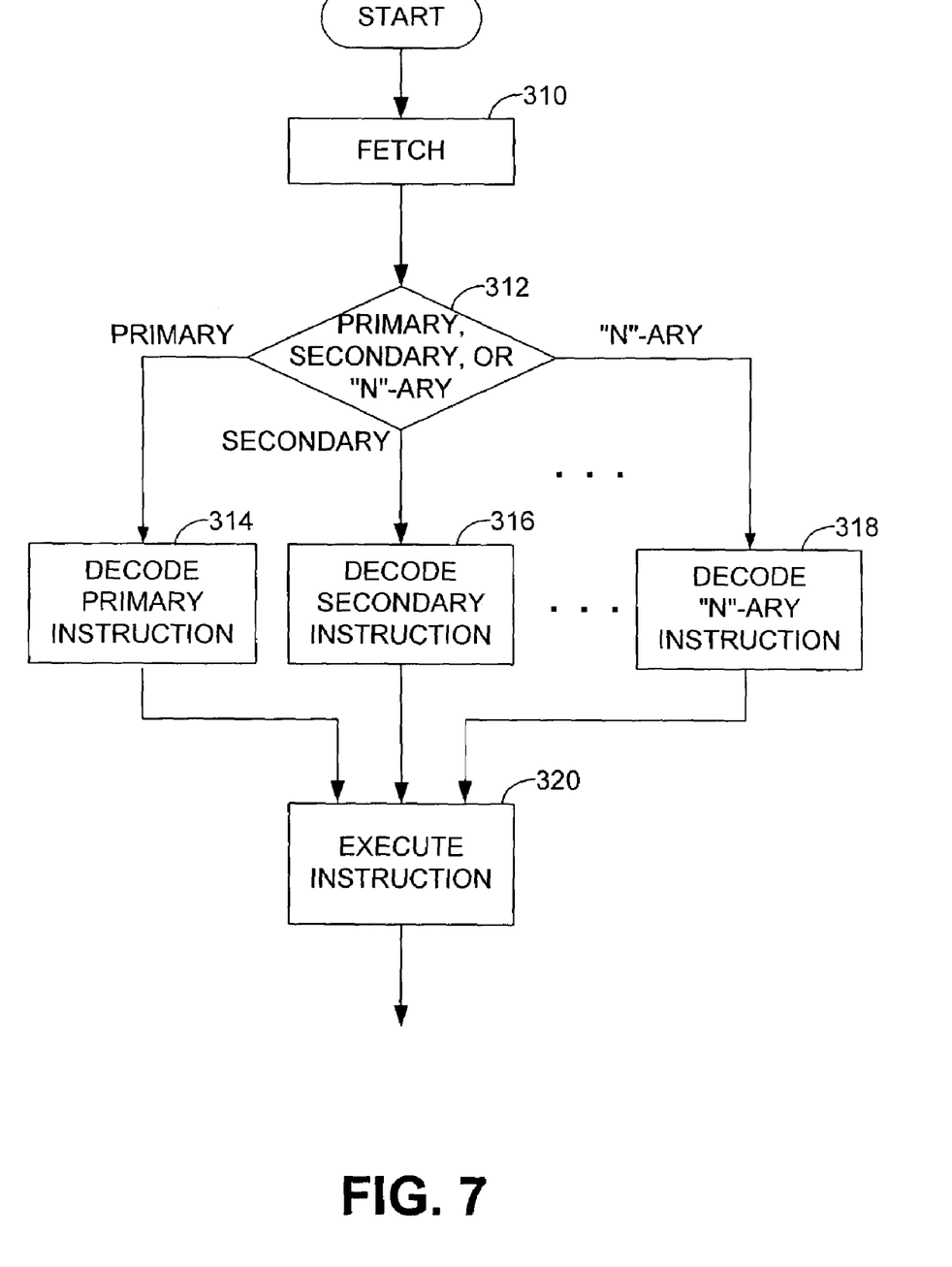
FIG. 7 is a flowchart illustrating certain steps in a method of performing a decode operation in accordance with an alternative embodiment of the invention.

Reference is now made to FIG. 7, which is a flowchart illustrating the top-level operation of an alternative embodiment of the present invention. In accordance with the method of FIG. 7, a fetch operation is performed at step 310. Then, at step 312, the method determines whether the fetched instruction belongs to a primary, secondary or other instruction set. Based upon the resolution of step 312, the encoded instruction is directed to a decoder for decoding instructions within a primary instruction set (step 314), decoding instructions within a secondary instruction set (step 316), or decoding instructions within some other instruction set (step 318). Thereafter, the decoded instruction is executed at step 320.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A processor comprising:
   fetch logic for fetching an encoded instruction;
   first decoder logic capable of decoding a plurality of encoded instructions of a first instruction set, the first decoder logic having an input to receive an encoded instruction output from the fetch logic;
   second decoder logic capable of decoding a plurality of encoded instructions of a second instruction set, the second decoding logic having an input to receive an encoded instruction output from the fetch logic, wherein instructions of the first instruction set are of a different length than instructions of the second instruction set;
   decoder control logic configured to selectively control active operation of the first decoder logic and the second decoder logic, such that when the first decoder logic is decoding an instruction then the second decoder logic is operated in a lower-power, inactive mode, and when the second decoder logic is decoding an instruction then the first decoder logic is operated in a lower-power, inactive mode; and
   logic for directing an instruction from the fetch logic to either the input of the first decoder or the input of the second decoder, based upon whether the instruction is an instruction of the first instruction set or an instruction of the second instruction set.

2. The processor of claim 1, wherein each of the instructions of the second instruction set are different from each of the instructions of the first instruction set.

3. The processor of claim 1, further including execution logic for executing instructions decoded by the first and second decoder logic.

4. A portable electronic device comprising the processor of claim 1.

5. The processor of claim 1, wherein the decoder control logic is responsive to the encoded instruction output from the fetch logic, the decoder control logic being configured further ensure that no more than one of the first decoder logic and second decoder logic are actively operative at a given time.

6. The processor of claim 1, further including third decoder logic capable of decoding a plurality of instructions of a third instruction set, the third decoder logic having an input to receive an encoded instruction output from the fetch logic.

7. The processor of claim 6, wherein the decoder control logic is further configured to selectively control active operation of the first decoder logic, the second decoder logic, and the third decoder logic, such that no more than one of the first decoder logic, second decoder logic, and third decoder logic are actively operative at a given time.

8. The processor of claim 7, wherein the decoder control logic is further configured to ensure that, when any one of the first decoder logic, second decoder logic, and third decoder logic components is actively operating to decode an instruction, that all other decoder logic components is maintained in an inactive, low-power state.

9. A processor comprising:
   a plurality of decoders, each of the plurality of decoders being uniquely designed for decoding a plurality of instructions of an instruction set that are distinct and nonoverlapping with the instructions of other instruction sets to be decoded by the remaining decoders, wherein the instructions of the instruction set are of a different length than the instruction of the other instruction sets;
   decoder control logic configured to ensure that only one of the plurality of decoders is operative to decode an instruction at any given time and to ensure that the remaining decoders are maintained in inactive, low-power modes while the one decoder is actively decoding an instruction; and
   logic for directing an instruction from fetch logic to either an input of a first decoder or an input of another decoder, based upon whether the instruction is an instruction of a first instruction set or an instruction of a second instruction set.

10. The processor of claim 9, further including execution logic for executing decoded instructions.

11. A portable electronic device comprising the processor of claim 9.

12. A processor comprising:
   a first decoder capable of decoding a first plurality of instructions of a first instruction set;
   a second decoder capable of decoding a second plurality of instructions of a second instruction set, wherein instructions of the first instruction set are of a different length than instructions of the second instruction set;
   decoder control logic configured to selectively control active operation of the first decoder and the second decoder, such that, when the first decoder is decoding an instruction, then the second decoder is maintained in a lower-power, inactive mode; and
   logic for directing an instruction from fetch logic to either an input of the first decoder or an input of the second decoder, based upon whether the instruction is an instruction of the first instruction set or an instruction of the second instruction set.

13. The processor of claim 12, wherein the decoder control logic is further configured to selectively control active operation of the first decoder and the second decoder, such that when the second decoder is decoding an instruction then the first decoder is maintained in a lower-power, inactive mode.

14. A method for decoding a processor instruction comprising:
   determining whether the instruction is an instruction of a first instruction set or a second instruction set, wherein instructions of the first instruction set are of a different length than instructions of the second instruction set;
   if the instruction is determined to be an instruction of a first instruction set, then directing the instruction to a first decoder and decoding the instruction using the first decoder, and causing a second decoder to remain in an inactive, low-power mode while the first decoder is decoding the instruction; and
   if the instruction is determined to be an instruction of a second instruction set, then directing the instruction to the second decoder and decoding the instruction using the second decoder, and causing the first decoder to remain in an inactive, low-power mode while the second decoder is decoding the instruction.

15. The method of claim 14, wherein the determining further comprises determining whether the instruction is an instruction of a first instruction set, a second instruction set, or a third instruction set.

16. The method of claim 15, wherein:
   if the instruction is determined to be an instruction of the first instruction set, then decoding the instruction using a first decoder, and causing the second decoder and the third decoder to remain in inactive, low-power modes while the first decoder is decoding the instruction;
   if the instruction is determined to be an instruction of the second instruction set, then decoding the instruction using a second decoder, and causing the first decoder and the third decoder to remain in inactive, low-power modes while the second decoder is decoding the instruction; and
   if the instruction is determined to be an instruction of the third instruction set, then decoding the instruction using a third decoder, and causing the first decoder and the second decoder to remain in inactive, low-power modes while the third decoder is decoding the instruction.

* * * * *